(12) United States Patent
Mohebbi

(10) Patent No.: US 8,452,231 B2
(45) Date of Patent: May 28, 2013

(54) SHORT RANGE BOOSTER

(75) Inventor: Behzad Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 812 days.

(21) Appl. No.: 12/279,814

(22) PCT Filed: Feb. 2, 2007

(86) PCT No.: PCT/US2007/061567
§ 371 (c)(1),
(2), (4) Date: Nov. 17, 2008

(87) PCT Pub. No.: WO2007/098313
PCT Pub. Date: Aug. 30, 2007

(65) Prior Publication Data
US 2009/0239521 A1  Sep. 24, 2009

Related U.S. Application Data

(60) Provisional application No. 60/765,100, filed on Feb. 3, 2006.

(51) Int. Cl.
*H04B 7/15* (2006.01)
*H04B 7/02* (2006.01)

(52) U.S. Cl.
USPC ........................................ 455/11.1; 455/101

(58) Field of Classification Search
USPC ............. 455/11.1, 7, 422.1, 423, 67.11, 41.2, 455/422, 450, 452.2, 435.1, 411; 370/332, 370/253, 338, 350, 328–329, 335–336
See application file for complete search history.

(56) References Cited

U.S. PATENT DOCUMENTS 7,519,323 B2 * 4/2009 Mohebbi ....................... 455/11.1
2005/0135295 A1 * 6/2005 Walton et al. .................. 370/328
(Continued)

FOREIGN PATENT DOCUMENTS

EP 0497490 8/1992
EP 0497490 A2 8/1992
(Continued)

OTHER PUBLICATIONS

PCT Notification of Transmittal of the International Search Report and the Written Opinion of the International Searching Authority, mailed Nov. 2, 2007.

(Continued)

*Primary Examiner* — Nay A Maung
*Assistant Examiner* — Cindy Trandai
(74) *Attorney, Agent, or Firm* — Mintz Levin Cohn Ferris Glovsky and Popeo, P.C.

(57) ABSTRACT

A repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit adapted to communicate signals between the network transceiver and the user transceiver in autonomous repeater hops between the network transceiver and the network unit, between the user transceiver and the user unit, and between the network unit and the user unit including downlink transmission from the network unit to the user unit and uplink transmission from the user unit to the network unit, and a detection unit coupled to the network unit and the user unit adapted to detect frame timing of downlink and uplink transmissions respectively by detecting a preamble sequence of downlink and/or uplink transmissions.

10 Claims, 8 Drawing Sheets

U.S. PATENT DOCUMENTS

2005/0254442 A1  11/2005  Proctor, Jr. et al.
2007/0066220 A1* 3/2007  Proctor et al. ............... 455/11.1
2007/0268846 A1* 11/2007 Proctor et al. ............... 370/279

FOREIGN PATENT DOCUMENTS

| WO | 03/058984 | 7/2003 |
| WO | WO-03/058984 A2 | 7/2003 |
| WO | 2005/069249 | 2/2005 |
| WO | WO-2005069249 A1 | 7/2005 |

OTHER PUBLICATIONS

EPO Extended European Search Report dated Oct. 8, 2009, issued in connection with counterpart European application No. 07717547.9-1246.

European Search Report dated May 15, 2012, for corresponding European Patent Application No. 12001293.5.

* cited by examiner

SHORT RANGE BOOSTER

BACKGROUND

The existing cellular networks, such as (Global System for Mobile Communications (GSM) and IS95, are intended to provide a contagious and continuous coverage, so as to support the high terminal mobility expected from such systems. However, despite careful network design, indoor (in-building) coverage, or the coverage of places with high shadowing attenuation (e.g. tunnels) of such networks is often "patchy", with "coverage Holes" at best, and no coverage at worst. The reason for the impaired indoor coverage is that the cellular base stations are usually placed outside buildings, higher than the average building heights, to provide large area coverage. Although the signal may be adequate at "street-level", it is severely attenuated by the building material, reducing the signal power in-building, resulting in the poor converges. Loss of signal power (attenuation) depends on the building material and can be tens of dBs for each wall penetration. The problem is exacerbated in the $3^{rd}$ generation systems such as Wideband Code Division Multiple Access (WCDMA) and cdma2000, as these new systems have the capability of high data transmission, which results in lower information bit energy ($E_b$), and much reduced link budget and cell footprint. Currently, the common solutions for providing indoor coverage are:

I) More outdoor base stations in the same geographical area, supporting smaller cell sizes.
II) Microcells.
III) Picocells (in-building cells).
IV) Conventional repeaters.

Clearly all the above solutions (except the repeater solution) are very expensive and involve extensive investment in the cellular network infrastructure and are much more complex in planning and operation. There are other solutions such as repeaters that can be used to boost the signal in a given geographical area.

The repeater solution, although cheaper than a base station, has several drawbacks. These outdoor repeaters are still too expensive for a private user, and involve careful planning. Most use large directional antennas, or additional backhaul frequencies to reduce antenna gain specifications, which results in lower spectral efficiency and are capacity limited. The repeaters tend to transmit the maximum allowed transmit power and often cause increased interference in the network and accordingly may be unsuitable for network operators. The indoor repeaters are still cheaper than the outdoor version, but typically involve installation of high directional antennas on the roof, and ensured antenna isolation, creating costly demand for skilled installation and operation. Therefore, the system generally remains too complicated for an unskilled user and not sufficiently inexpensive for usage in a much localized coverage area.

SUMMARY

In accordance with an embodiment of a communication device, a repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit adapted to communicate signals between the network transceiver and the user transceiver in autonomous repeater hops between the network transceiver and the network unit, between the user transceiver and the user unit, and between the network unit and the user unit including downlink transmission from the network unit to the user unit and uplink transmission from the user unit to the network unit, and a detection unit coupled to the network unit and the user unit adapted to detect frame timing of downlink and uplink transmissions respectively by detecting a preamble sequence of downlink and/or uplink transmissions.

BRIEF DESCRIPTION OF THE DRAWINGS

Embodiments of the invention relating to both structure and method of operation may best be understood by referring to the following description and accompanying drawings whereby.

DETAILED DESCRIPTION

The system disclosed herein provides better, and localized indoor coverage without causing excess interference in the network, usage of costly equipment or network planning. The system increases the overall network capacity, reducing the mobile and BTS transmit power, increasing the battery life and reducing the "harmful" radiation to the user.

Descriptions of the illustrated embodiments are based on a GSM (Global System for Communications) network, which is a Time Division Multiple Access-Frequency Division Duplex (TDMA/FDD) based system operating at various spectrum bands, depending on the country and the region's regulations. However, the disclosure, with minor modifications, is equally applicable to any other cellular system, including (but not limited to) IS95, cdma2000 and WCDMA, and with further modifications applicable to wireless LAN systems such as 802.11a, b, and g. Although the description is given for cellular systems, with minor modifications, it can equally be applied to other systems such as GPS or any other system that uses signal-boosting capability. The operating frequency can be at a selected part of communications spectrum used for mobile communications (e.g. PCS1900, or DCS1800 or GSM900 or UMTS 2000, ISM or UNII band). The description here is only intended as an example and as such utilization of the booster is not only limited to the in-building coverage and can be used in other places such as trains, planes, cars, tunnels, etc. Also, the example may not include all minute or unimportant design details. Units and sub-units discussed and explained hereafter meet regulations of the respective licensed and unlicensed band of operation. Therefore, for the different example implementations and embodiments disclosed, specifications including maximum transmit power, spectral mask, out of band radiation, and others for transmitters, receivers, repeaters and boosters, are met for both licensed and unlicensed bands of operation.

Figure 1:
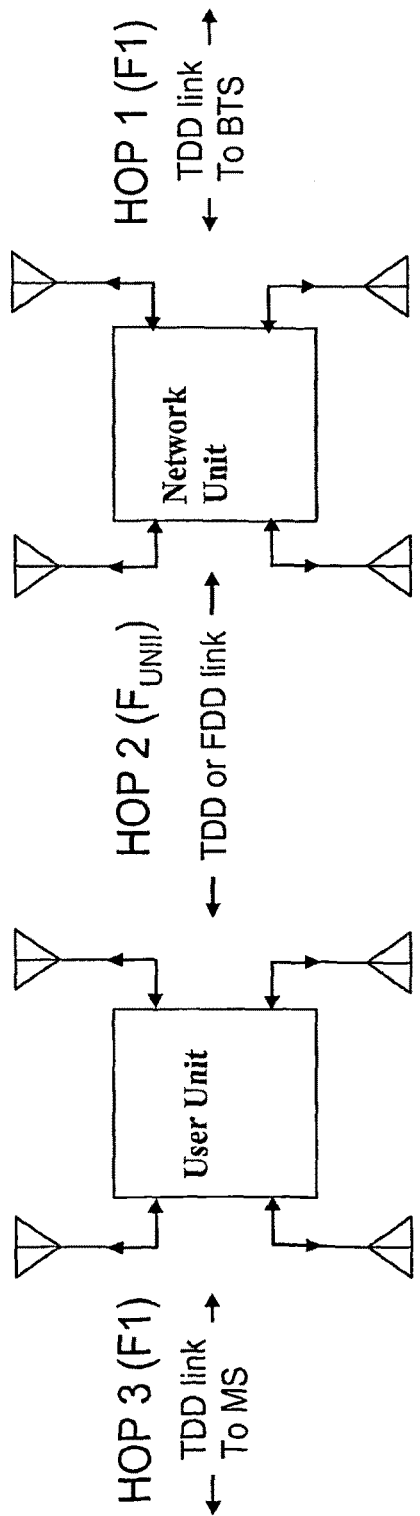
FIG. 1 is a schematic block diagram depicting an embodiment of a booster system that can be used in a TDD system.
Figure 2:
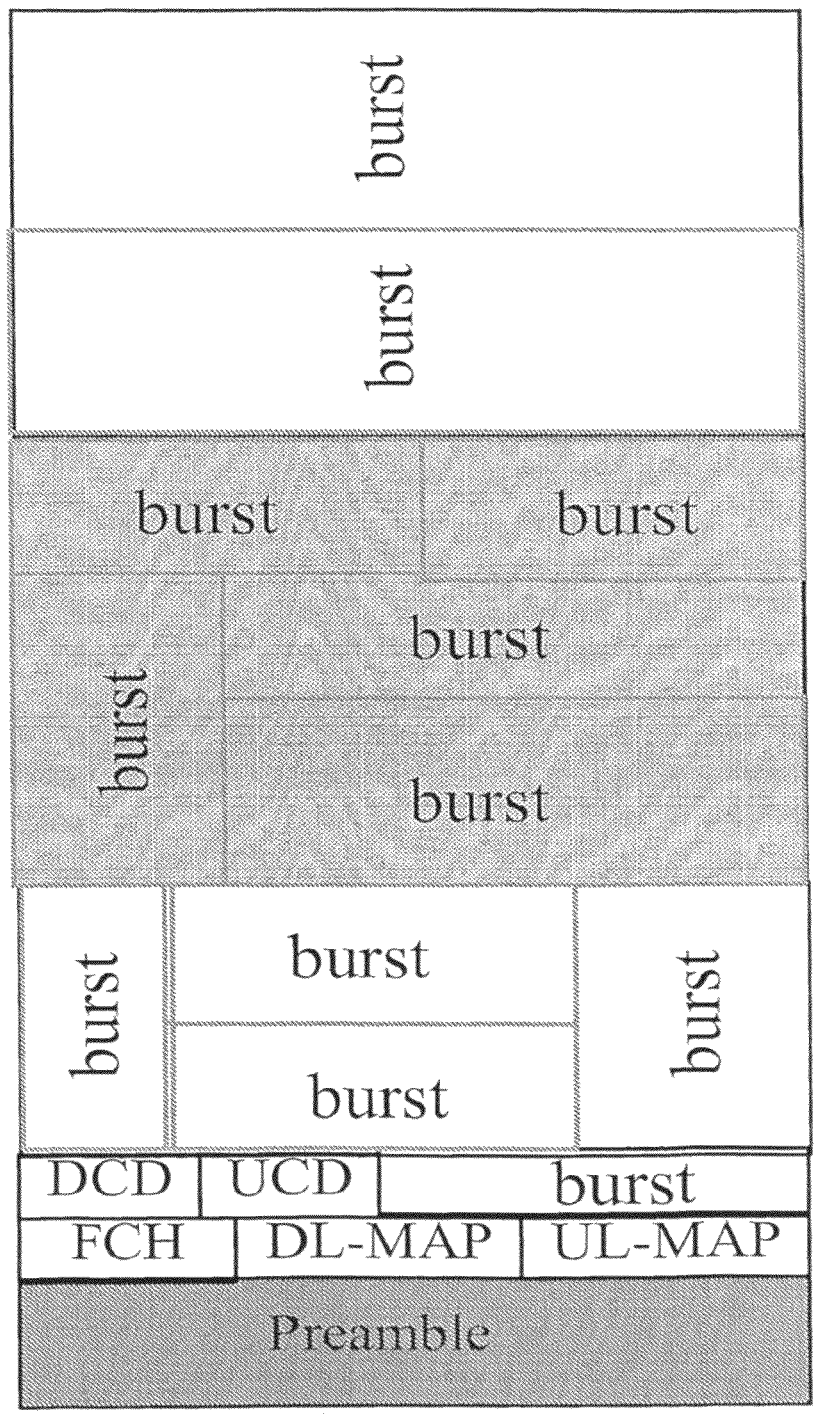
FIG. 2 is a block diagram showing structure of a downlink WiMax frame.

Disclosed with reference to FIGS. 1 and 2 is an extension of systems disclosed with respect to following FIGS. 3 through 8 which describe a Frequency Division Duplex (FDD) cellular system. FIGS. 1 and 2 describe a similar booster system which enables a Time Division Duplex (TDD) cellular or wireless system such as World Interoperability for Microwave Access (WiMax) or Time Division-Synchronous Code Division Multiple Access (TD-SCDMA). In a TDD system, the base station (BTS) uses the same frequency for communication on the forward and the reverse links to a mobile station (MS) unit.

Referring to FIG. 1, a schematic block diagram depicts an embodiment of a booster system that can be used in a TDD system. In the TDD version of the short range booster, Hop1 and Hop3 are substantially at the same frequency. However, Hop2 is tuned to operate at UNII or ISM band. Hop1 is the communication link to the BTS, while Hop3 is the communications link to the MS. Hop2 is the communications link between the Network unit and User unit elements of the booster system, which include a two-way traffic and control channels. While the cellular/wireless system operating at F1 in TDD mode in a system such as Wimax, Hop2 traffic or control or both channels can operate in TDD or FDD modes.

Both the Network and the User units of the booster have a new detection unit that can detect the frame timing of downlink and uplink transmissions respectively. Therefore the Network and the Users units now can detect the start of the downlink (by Network unit) and uplink (by User unit) beacon, pilot or other broadcast or traffic channels, by detecting (in time or frequency or both) the "preamble" sequence (for example as shown in FIG. 2) of the downlink and/or uplink TDD transmissions, just as the MS would do in the network. FIG. 2 is a block diagram showing structure of a downlink WiMax frame.

For the booster system to be able to operate in a TDD cellular/wireless network, with the Control channel on hop2 ON, but with traffic channel on hop2 and transmission on hop1 and hop3 "OFF", the Network unit, for example as described in FIGS. 3 through 8 or in other suitable embodiments, detect the downlink (forward link from BTS to MS) frame timing. For such functionality the Network unit has to detect the start of the downlink beacon, pilot or other broadcast or traffic channels, for example by detecting the "preamble" sequence (shown in FIG. 2) of the downlink transmissions in time or frequency or both, just as the MS would do in the network. In a symmetric TDD system, where the downlink and up link frames are equal in length, and the duration of the frame is known, the start of the frame timing is sufficient for the active operation of the booster traffic channel on hop2 and transmissions in hop1 and hop3. Frame timing information is passed to the User unit, via the control channel on hop2, so that the user unit would also know the timing of the downlink and consequently uplink frames. Then after, the two units would configure the respective hop1, 2 and 3 for transmit and receive, for passing of the forward and reverse link information to/from MS and BTS, based on the framing structure of the system they operate in. The calibration signal referenced in FIGS. 3 through 8, which is used for estimating the path loss between the two Network and user units, is only transmitted in either forward or reverse link at a given time, depending on the frame flow through the booster at the time. The result of channel sounding which ends up in the network unit or user unit (depending on the frame direction) is then passed to the other unit for the next immediate frame transmission in the opposite direction. The channel sounding results for the forward and the reverse links are identical as the links are tuned to the same frequency.

For scenarios where the forward and reverse link frame structure is not symmetric, the network unit has to detect both the beginning and end of the frame. The detection of the beginning of the frame, as mentioned, can be based on "Preamble detection, while the end of the frame detection can be based on received signal level change. The detection of the beginning and the end of the frame in downlink (or/and at the user unit in the uplink) is an "on going" operation. If a change in the transmission pattern is detected, under the instruction of the master unit (network unit), both units go into the "Variable Boundary mode" where both Network and User units switch to receive mode, trying to detect the "Preamble" of an incoming frame. Upon the detection of the "preamble" by one of the units, the data is delayed by buffering, the detection event is communicated to the other unit via the control channel, so that the other unit can reconfigure its RX/TX path, and the frame is forwarded via the traffic channel of hop2, following the initial delay required for the transceivers setup. The said delay is much less than the Guard time period that is specified for the TDD system in which the booster is operating in. The frame is forwarded from one unit to the other via the traffic channel on hop2, until the end of frame is detected by the unit that first detected the "preamble", after which the end-of-frame event is flagged to the other unit via the control channel of hop2. After the successful transmission of the on-going frame, the two units return to the receive mode trying to detect the "preamble" in both uplink and downlink direction and the above operation is repeated. The Variable Boundary mode is repeated unit such time that a new switching pattern between the up and down link frames is detected (say after a 1000 frames), and the two units follow the fix Tx/Rx sequences operation described in the fixed-switching TDD case, units such time that a change is detected in the preamble position again, in which case the two units return to the variable-boundary Detection mode.

Figure 3:
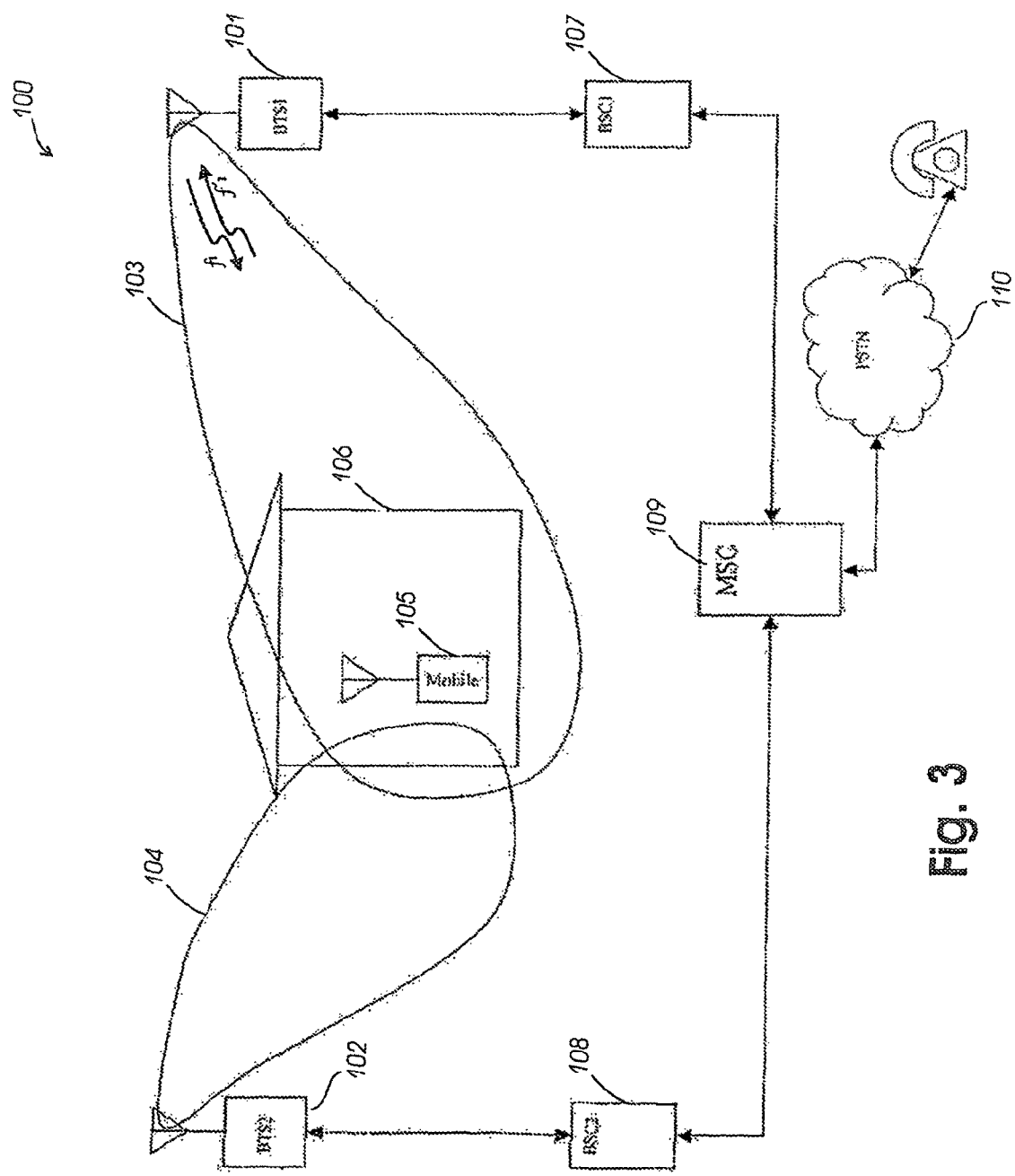
FIG. 3 is a schematic block diagram illustrating an embodiment of a cellular network with two base stations.

FIG. 3 shows a cellular network 100 with two base stations (BTS1 (101) & BTS2 (102)). A typical network supports more than two base stations. The disclosed system may be applied in any size network, regardless of the supported number of base stations. BTS1 101 is connected to Base Station Controller BSC1 107. BTS2 102 is connected to Base Station Controller BSC2 108. BTS2 102 can also be connected to Base Station Controller BSC1 107, instead of BSC2 108. BSC1 107 is connected to Mobile Switching Center MSC 109. BSC2 108 is connected to MSC 109, or instead may be connected to another MSC in the network. MSC 109 is connected to PSTN 110. BTS1 101 has an associated coverage area 103. BTS2 102 has an associated coverage area 104. These coverage areas may or may not overlap. However, usually the network is planned such that there is considerable overlap, to facilitate handoffs. The mobile terminal 105 is inside building 106, in the coverage area 103 communicating with BTS1 101, using a traffic channel transmitted at around frequency f1 in the forward-link and its associated reverse-link frequency, f1'. The traffic channel can be one of the available time slots on the BCCH carrier, or may be on a TCH carrier, where frequency hopping may be used to reduce interference. Mobile terminal 105 may or may not be in coverage area 104, but the mobile unit 105 is well within the coverage area 103 and average signal power from BTS1 101 is much stronger than the average signal power from BTS2 102, within the building 106, and the locality of mobile unit 105. Root-mean-square (rms) forward-link signal level $\hat{S}_{,1}$, outside the building 106 is higher than the rms signal level $\hat{S}_2$ inside the building by the wall penetration loss α. The loss α may be such that $\hat{S}_2$ is not at sufficiently high level for the mobile unit 105 to maintain reliable communication with BTS1 101, or BTS2 102, or both BTS1 101 and BTS2 102. Further, the signal level $\hat{S}_2$ may be such that mobile unit 105 may have difficulty to setup and maintain a communication link with BTS1 101 or BTS2 102, or both BTS1 101 and BTS2 102, or the communication link does not have the selected performance and reliability, in all or some of the in-building areas. The coverage problem inside the building 106 may be solved by more transmit power from BTS1 101 in the down-link to combat the signal loss, by the wall penetration loss, α. The rms reverse-link signal level $\hat{S}'_1$, inside the building 106 is higher than the rms signal level $\hat{S}'_2$, outside the building, by the wall penetration loss α'. The loss α' may be such that $\hat{S}'_2$ is not at sufficiently high level for the mobile unit 105 to maintain reliable communication with BTS1 101, or BTS2 102, or both BTS1 101 and BTS2 102. Further, the signal level $\hat{S}'_2$ may be such that mobile unit 105 may have difficulty to setup and maintain a communication link with BTS1 101 or BTS2 102, or both BTS1 101 and BTS2 102, or the communication link does not have the selected performance and reliability, in all or some of the in-building areas. The coverage problem inside the building 106 may be solved by more transmit power from mobile unit 105 in the up-link to combat the signal loss, by the wall penetration loss, α'. Usually the forward and reverse link frequency pairs are sufficiently close, such that α level is substantially similar to α' level.

Figure 4:
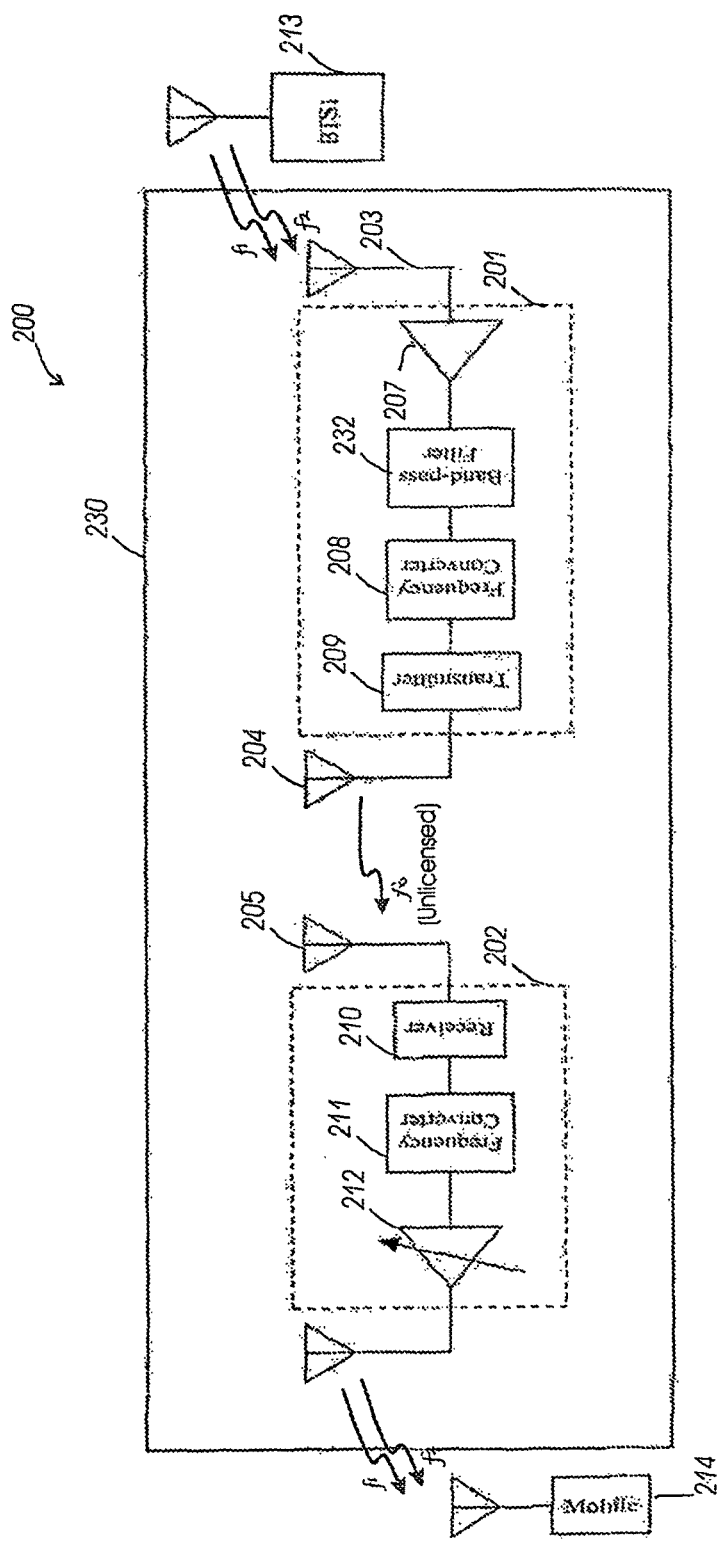
FIG. 4 is a schematic block diagram depicting an embodiment of a forward-link part of a repeater.

FIG. 4 depicts a forward-link part 230 of the repeater 200. The forward-link portion 230 in a simple form supplies improved indoor coverage by boosting the signal level in building in the forward-link of the cellular network. BTS1 213 has a BCCH radio channel (beacon channel) transmitted substantially close to f1. BTS1 213 is in communications with the mobile unit 214 at a frequency substantially close to f1 (the BCCH carrier frequency) or another carrier frequency, f2, that may or may not be frequency hopping. There may or may not be other frequencies that are transmitted by BTS1 213, or other base stations in the same area, which are not shown in the FIG. 4.

The device has two separate units, the "Forward-link Network unit" 201, which is placed where good signal coverage exists, indoor or outdoors, and the "Forward-link User unit" 202, which is placed where good signal coverage does not exist, indoor or outdoors. The Forward-link Network unit 201 is connected to an antenna 203, tuned to operate at the cellular network operating frequency band. The Forward-link Network unit 201 is also connected to an antenna 204 tuned to operate at suitable Unlicensed National Information Infrastructure (known as U-NII) bands, where the system is designed to operate at U-NII spectrum bands. Subject to the relevant regulations, the system can also be designed to operate at Unlicensed Personal Communications Services (U-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be implemented in some embodiments. Some design modifications are useful, for ISM band operation. The modifications are related to the minimum spreading factor of 10 specified for the ISM band operation, and the maximum allowed transmit power. If the system is designed to operate in ISM band, the signal may use further spread spectrum modulation/demodulation and other modifications to meet FCC 47 CFR Part-15, subpart E specifications.

The frequency bands defined for U-NII operations are as follows:
1) 5.15-5.25 GHz @ Max Transmit power of 2.5 mW/MHz
2) 5.25-5.35 GHz @ Max Transmit power of 12.5 mW/MHz
3) 5.725-5.825 GHz @ Max Transmit power of 50 mW/MHz Any unlicensed operation in U-NII band is allowed, as long as the signal transmissions meet FCC 47 CFR Part-15. So operation of the described booster generally complies with standards of the FCC 47 CFR Part-15 (subpart E for U-NII frequencies). Regulations commonly specify transmit power, emission limits, and the antenna gain limits and are implemented for an acceptable device.

The "Forward-link User Unit" 202 is connected to an antenna 205 tuned to operate in the same frequency band as antenna 204, which is U-NII band in some embodiments. The Forward-link User unit 202 is also connected to an antenna 206 tuned to operate at the cellular network operating band.

Antenna 203 is connected to a (Low Noise Amplifier) LNA unit 207, which is further connected to a bandpass filter 232. LNA unit 207 may be a high performance amplifier, with a typical gain of 15 dB and a noise figure of 1.5 dB with sufficient bandwidth to cover the appropriate portion of the spectrum manually or automatically. The bandpass filter 232 can be designed to pass all or a desired part of the interested cellular spectrum, or can be a bank of overlapping bandpass filters, covering the full spectrum of the interested cellular system, with a RF switch, such that the selected band and bandwidth can be selected. The bandpass filter 232 is connected to frequency converter 208. The frequency converter 208 is capable of converting the cellular network operating spectrum band to a desirable part of the U-NII spectrum, and includes components such as mixers and filters for correct operation. The frequency converter 208 is connected to the Forward-link Network unit transmitter 209. The transmitter unit 209 is designed to operate in U-NII band and conforms to the FCC 47 CFR Part-15, subpart E regulations, and can be as simple as a single amplifier operating at the desirable U-NII operation band, or more complex transmitter with amplifiers and filters, or even a WLAN transmitter such as 802.11a. The transmitter unit 209 is connected to antenna 204.

Antenna 205 is connected to the Forward-link User unit receiver 210, which is designed to receive the signal transmitted by unit 201. The receiver 210 which is connected to frequency converter 211, can be as simple as a single LNA operating at desirable U-NII band of device operation, or it can be better designed with additional functionalities such as automatic gain control (AGC), multiple cascaded amplification stages, and variable channel select filters, or even a Wireless Local Area Network (WLAN) receiver such as 802.11a (where the transmitter part of 802.11a is used in the Network unit 209). If automated gain control (AGC) is used in receiver 210 and the unit is designed for Code Division Multiple Access (CDMA) cellular networks, performance is enhanced by selecting AGC bandwidth to be substantially smaller than the power control repetition rate of the CDMA system, for example less than 1.5 kHz in WCDMA networks, so that AGC operation does not interfere with closed-loop power control. Frequency converter unit 211, which is connected to receiver unit 210 and variable gain amplifier unit 212, converts the input signals, from U-NII band, to the cellular network operating frequencies, and includes all components such as mixers and filters for correct operation. The frequency converter unit 211 performs the opposite conversion operation of the frequency converter unit 208, and includes all components such as mixers and filters for correct operation.

The frequency converter 211 is connected to the Variable Gain (VG) amplifier 212, operating at the cellular network operating frequency band. The variable gain amplifier 212 is connected to antenna 206, which transmits signals with substantially similar frequencies to the frequencies transmitted by base station 213 and conforms to cellular system specifications.

The signal radiated by antenna 208, which is an amplified repeated version of the original incident signal received by antenna unit 203, will experience some loss in the power level, before returning and re-entering the antenna 203 again. The re-entered signal into antenna 203 is termed "Down-link Returned-Signal" hereafter. The ratio of the rms signal value of the Down-link Returned-Signal to the rms value of the original incident signal at the output of the antenna 203 terminator, with system and propagation path delays between the antenna units 208 and 203 removed, is the Down-link Returned-Signal path loss, and is termed here as the "Down-link System Path Loss" and referred to as $PL_{dl}$.

Further, the "Down-link System Link Gain", which is here referred to as $G_{dl}$, is defined as "the ratio of the rms signal value at the input to the antenna 208 terminator, to the rms signal value, at the antenna 203 terminator, where the Down-link System Path Loss, $PL_{dl}$, as defined above, is infinite (for example no EM coupling path between antenna 208 and antenna 203), and all the system and propagation path delays (from antenna 203, through the system to antenna 208) are removed".

The variable gain amplifier unit 212 gain is set such that Down-link System Link Gain, $G_{dl}$, is less than the Down-link System Path Loss, $PL_{dl}$, by $dg_{dl}$, so as to avoid a "positive feed-back" loop in the system, for example, $$G_{dl}=PL_{dl}-dg_{dl} \text{ (dB)}$$

Note that all values of $PL_{dl}$, $G_{dl}$, and $dg_{dl}$ are all in dB. The value of $dg_{dl}$ ranges from 0 to $PL_{dl}$, and can be assumed to be 3 dB for the purposes of the description here. However, it is possible to select better values for $dg_{dl}$, where the system performance is optimized further.

Figure 5:
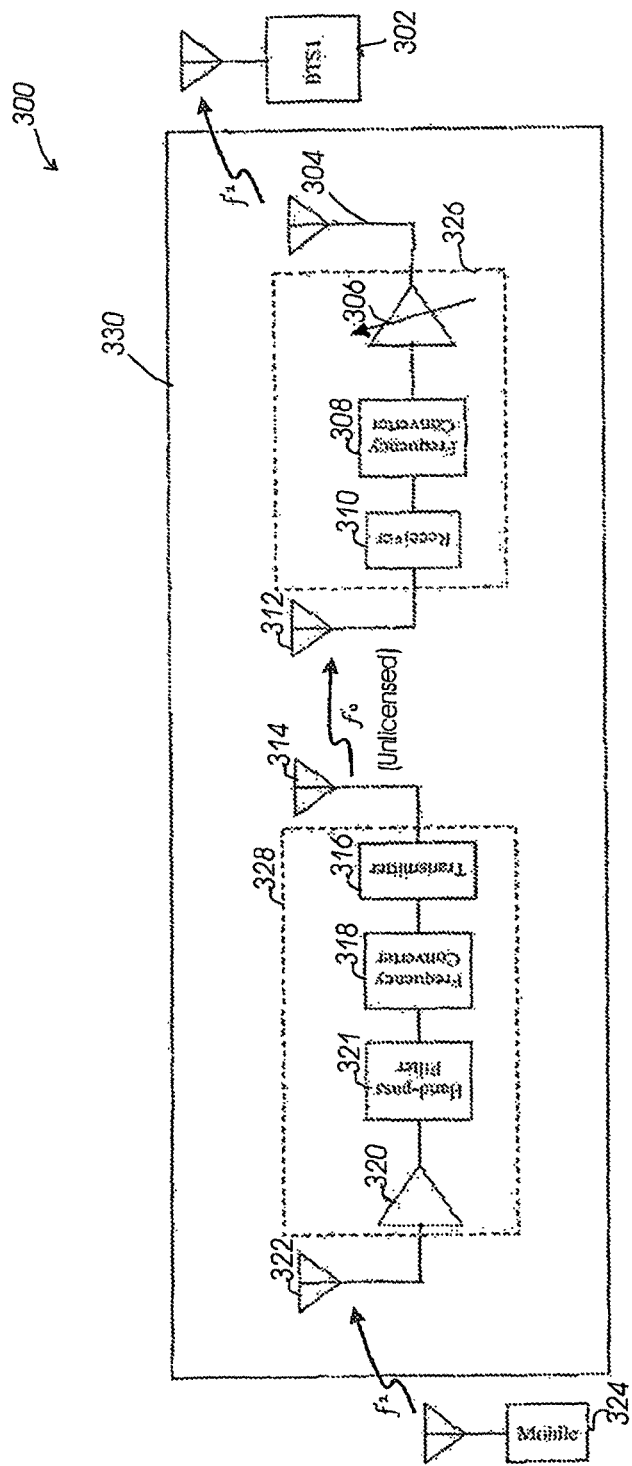
FIG. 5 is a schematic block diagram showing an embodiment of a reverse-link part of a repeater.

FIG. 5 depicts an embodiment of the reverse-link part 330 of a repeater 300. The reverse-link portion 330 in a simple form improves indoor coverage by boosting signal level in building in the reverse-link of the cellular network to such level that attains acceptable link performance. BTS1 302 has a BCCH radio channel (beacon channel) transmitted substantially close to f1, and a frequency pair, f'1 on the reverse-link. BTS1 302 is in communications with the mobile unit 324 at a frequency substantially close f'1 (the BCCH carrier frequency) or another carrier frequency, f'2, that may or may not be frequency hopping. There may or may not be other frequencies that are transmitted by BTS1 302, or other base stations in the same area, which are not shown in the FIG. 5.

The device has two separate units, the "Reverse-link Network unit" 326, which is placed where good signal coverage exists, indoor or outdoors, and the "Reverse-link User unit" 328, which is placed where good signal coverage does not exist, indoor or outdoors. The Reverse-link Network unit 326 is connected to an antenna 304, tuned to operate at the cellular network operating frequency band. The Reverse-link Network unit 326 is also connected to an antenna 312 tuned to operate at suitable Unlicensed National Information Infrastructure (U-NII) bands, where the system is designed to operate at U-NII bands. Subject to the relevant regulations, the system can also be designed to operate at Unlicensed Personal Communications Services (U-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be used in some system designs. Some design modifications are used for ISM band operation. The modifications are related to the minimum spreading factor of 10 used for ISM band operation, and the maximum allowed transmit power. If the system is designed to operate in ISM band, the signal uses further spread spectrum modulation/demodulation and other modifications to meet the FCC 47 CFR Part-15, subpart E specifications.

The frequency bands defined for U-NII operations are as follows:

1) 5.15-5.25 GHz @ Max Transmit power of 2.5 mW/MHz
2) 5.25-5.35 GHz @ Max Transmit power of 12.5 mW/MHz
3) 5.725-5.825 GHz @ Max Transmit power of 50 mW/MHz Any unlicensed operation in U-NII bands is allowed, as long as the signal transmissions meet with FCC 47 CFR Part-15. Operation of the illustrative booster meets specifications of FCC 47 CFR Part-15 (subpart E for U-NII frequencies).

The "Reverse-link User Unit" 328 is connected to an antenna 314 tuned to operate in the same frequency band as antenna 312, which is U-NII band for example. The Reverse-link User unit 328 is also connected to an antenna 322 tuned to operate at cellular network operating band.

Antenna 322 is connected to a LNA unit 320, which is further connected to a bandpass filter 321. LNA unit 320 may be a high performance amplifier with a typical gain of 15 dB and a noise figure of 1.5 dB with sufficient bandwidth to cover the appropriate portion of the spectrum. The bandpass filter 321 can be designed to pass all or a desired part of the cellular spectrum, or can be a bank of overlapping bandpass filters, covering the full spectrum of the interested cellular system, with a RF switch, such that the selected band and bandwidth can be selected manually or automatically. Bandpass filter 321 is connected to frequency converter 318. The frequency converter 318 is capable of converting the cellular network operating spectrum band to a desirable part of the U-NII spectrum, and includes all components such as mixers and filters for correct operation. The frequency converter 318 is connected to the Reverse-link User unit transmitter 316. The transmitter unit 316 is designed to operate in U-NII band and conforms to the FCC 47 CFR Part-15, subpart E regulations, and can be as simple as a single amplifier operating at the desirable U-NII operation band, or a more complex transmitter with amplifiers and filters or even a WLAN transmitter such 802.11a. The transmitter unit 316 is connected to antenna 314. The selected portion of the U-NII band of operation for the reverse-link part of the booster is different to the selected portion of the U-NII band of operation for Forward-link part of the booster, and sufficiently apart, so that no substantial interference is experienced from the operation of one link, to the other.

Antenna 312 is connected to the Reverse-link Network unit receiver 310, which is designed to receive the signal transmitted by unit 328. The receiver 310 which is connected to frequency converter 308, can be as simple as a single LNA operating at desirable U-NII band of device operation frequency, or it can be better designed with additional functionalities such as automatic gain control (AGC), multiple cascaded amplification stages, and variable channel select filters or even a WLAN receiver such as 802.11a (where the transmitter part of 802.11a is used in the User unit 316). If automated gain control (AGC) is used in receiver 310 and the unit is designed for CDMA cellular networks, performance is enhanced by selecting AGC bandwidth to be substantially smaller than the power control repetition rate of the CDMA system, for example less than 1.5 kHz in WCDMA networks, so that AGC operation does not interfere with closed-loop power control. Frequency converter unit 308, which is connected to receiver unit 310 and variable gain amplifier unit 306, converts the input signals, from U-NII band, to the cellular network operating frequencies, and includes all components such as mixers and filters for correct operation. The frequency converter unit 308 performs the opposite conversion operation of the frequency converter unit 318. The frequency converter 308 is connected to the variable gain amplifier 306, operating at the cellular network operating frequency band. The variable gain amplifier 306 is connected to antenna 304. Antenna 304 will be transmitting signals with substantially similar frequencies to the frequencies transmitted by mobile unit 324.

The signal radiated by antenna 304, which is an amplified repeated version of the original incident signal received by antenna unit 322, will experience some loss in the power level, before returning and re-entering the antenna 322 again. The re-entered signal into antenna 322 is termed "Up-link Returned-Signal" hereafter. The ratio of the rms signal value of the Up-link Returned-Signal, to the rms value of the original incident signal, at the output of the antenna 322 terminator, with system and propagation path delays between the antenna units 304 and 322 removed, is the Up-link Returned-Signal path loss, and is termed here as the "Up-link System Path Loss" and referred to as $PL_{ul}$.

Further, the "Up-link System Link Gain" which here is referred to as $G_{ul}$, is defined as "the ratio of the rms signal value at the input to the antenna 304 terminator, to the rms signal value, at the antenna 322 terminator, where the Up-link System Path Loss, $PL_{ul}$, as defined above, is infinite (for example no EM coupling path between antenna 304 and antenna 322), and all the system and propagation path delays (from antenna 322, through the system to antenna 304) are removed".

The variable gain amplifier unit 306 gain is set such that Up-link System Link Gain, $G_{ul}$, is less than the Up-link System Path Loss, $PL_{ul}$, by the amount of "Up-link gain margin", $dg_{ul}$, avoiding a "positive feed-back" loop in the system, for example, $$G_{ul}=PL_{ul}-dg_{ul}(dB).$$

Note that all values of $PL_{ul}$, $G_{ul}$, and $dg_{ul}$, are in dB. The value of $dg_{ul}$, ranges from 0 to $PL_{ul}$, and can be assumed to be 3 dB for the purposes of the description here. However, it is possible to select better values for $dg_{ul}$, where the system performance is optimized further.

Usually the forward and the reverse links frequency pairs are sufficiently close, such that $G_{ul}$ level is substantially similar to $G_{dl}$ level, and $PL_{ul}$ level is substantially similar to $PL_{dl}$ level and $dg_{ul}$ level is substantially similar to $dg_{dl}$ level.

The unique booster unit identity code and optionally the device location can be transmitted to the cellular network. The information can be used to locate a user in an indoor environment, for example by generating a heavily coded (protected), low bit rate data containing a long known preamble, the unique identity code, optionally the longitude, and the latitude of the reverse-link Network unit 326. The information can then be pulse-shaped for low spectral leakage and superimposed on the reverse-link signal of a given channel by an appropriate modulation scheme, within the reverse-link Network unit 326. The choice of the modulation scheme depends on the operating cellular system. For example, for GSM, which enjoys a constant envelope modulation such as Gaussian Minimum Shift Keying (GMSK), amplitude modulation (with low modulation index) can be used. For CDMA systems with fast reverse-link power control, Differential Binary Phase Shift Keying (DBPSK) can be used as the modulation scheme. Extraction of information from the received channel signal at base station may involve base station receiver modifications, but does not effect the normal operation of the cellular link.

Figure 6:
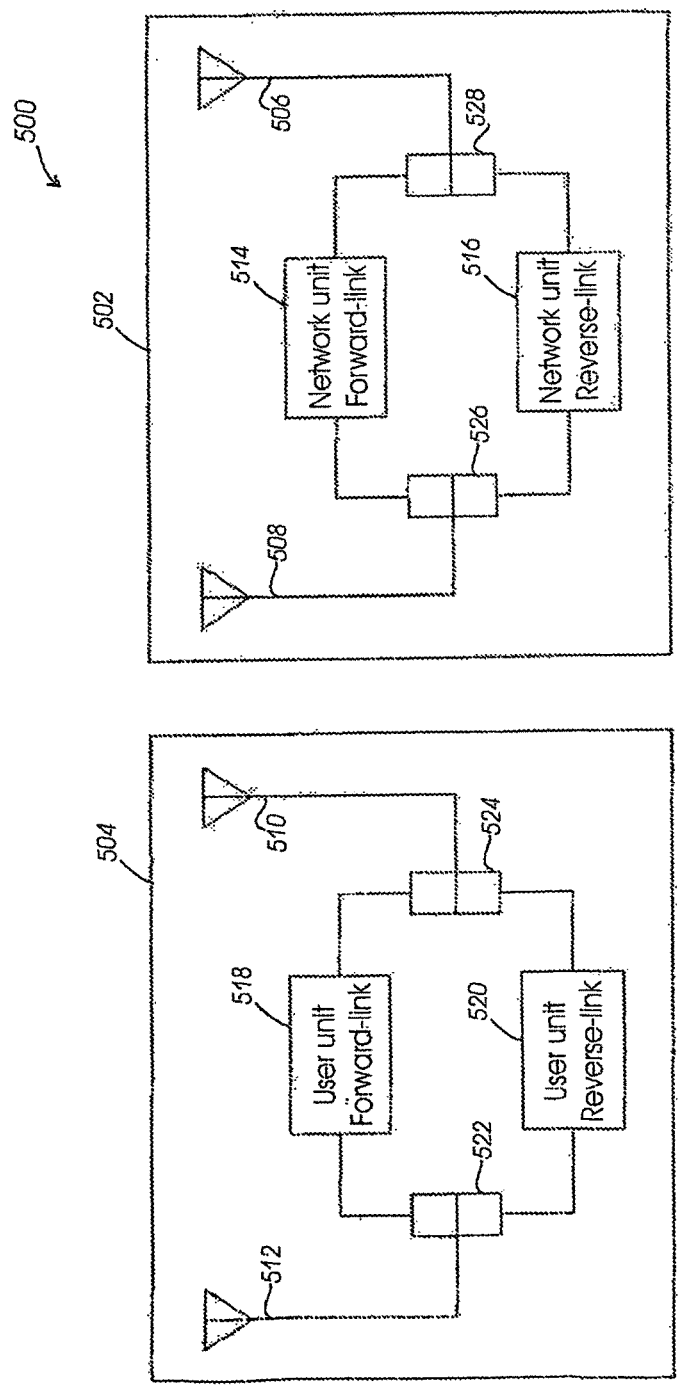
FIG. 6 is a schematic block diagram illustrating an embodiment of a system including a Network unit and a User unit.

FIG. 6 shows an embodiment of a system 500 including the Network unit 502, together with the User unit 504 in the same diagram. The Forward-link Network unit 514 (201 in FIG. 4) and the Reverse-link Network unit 516 (326 in FIG. 5) are now in one unit, referred to hereafter as the Network unit 502. The Forward-link User unit 518 (202 in FIG. 4) and the Reverse-link User unit 520 (328 in FIG. 5) are now in one User unit, referred to hereafter as the User unit 504. In FIG. 6, the transmit/receive antenna 203 in FIG. 4 and transmit/receive antenna 304 in FIG. 5 are replaced by a single antenna 506 and duplex filter 528. The duplex filter unit 528 is designed for optimum performance, and meets specifications for cellular operation. Also, the transmit/receive antenna 204 in FIG. 4 and transmit/receive antenna 312 in FIG. 5 are replaced by a single antenna 508 and duplex filter 526. Further, the transmit/receive antenna 205 in FIG. 4 and transmit/receive antenna 314 in FIG. 5 are replaced by a single antenna 510 and duplex filter 524 in FIG. 6. Equally, the transmit/receive antenna 206 in FIG. 4 and transmit/receive antenna 322 in FIG. 5 are replaced by a single antenna 512 and duplex filter 522 in FIG. 6. The duplex filter unit 522 is designed for optimum performance, and complies with specifications for cellular operation. GSM system is a FDD system, and as such reverse-link frequencies are different to that of the forward-link frequencies. In such system a duplex filter provides appropriate functionality. However, if the Network unit 502 and the User unit 504 are designed for a TDD system, the duplexers 528 and 522 can be replaced by hybrid combiners or "circulators". However, duplexers 526 and 524 are still used, since forward-link and reverse-link frequencies in the U-NII band are kept separate (for example FDD). With minor modifications, it is possible that, instead of antennas 508 and 510, a coaxial cable (such as RG58 or IS inch heliax) is used to connect the Network unit 502 to the User unit 504. In such an arrangement, where coaxial cable is used for the link connection, although still possible, up-conversion to U-NII bands is superfluous, and the system can operate with the Forward and reverse-link signals kept at original cellular frequencies.

Transmit power level for the Network Unit 502 in the cellular band is in the range of minus 10 dBm to 37 dBm with a downlink receiver sensitivity of about −110 dBm to −120 dBm. Transmit power level for the User Unit 504 in the cellular band is in the range of −20 dBm to 0 dBm with an up-link receiver sensitivity of about −110 dBm to −120 dBm.

The described booster system typically operates satisfactorily in limited scenarios, where the isolation between antennas 506 and 512 is more than the up-link and down-link System Link Gains. To ensure the correct operation of the booster system in all propagation and operating conditions, and without the need for the directional antennas, several features may be included in the system design.

1. Since both the Network unit 502 and the User unit 504 are for most time stationary relative to each other, and possibly other network elements such as base stations, antenna (space) diversity is used for transmit and receive operations.
2. The signals transmitted by antenna 506, in the reverse-link, are substantially at the same operating frequency band as the reverse-link signals received by antenna unit 512. Equally, the signals transmitted by antenna 512, in the forward-link, are substantially at the same operating frequency band as the forward-link signals received by antenna unit 506. As the signals received by the Forward-link Network unit 514 are transmitted to Forward-link User unit 518, via antenna units 508 and 510, and further, as the signal received by the Forward-link User unit 518 is then amplified before the retransmission via antenna unit 512, a feed-back loop, through the antennas 512 and 506, between the two Forward-link Network unit 514 and Forward-link User unit 518 exists. Any gain in the loop causes "positive feed-back", which results in unstable operation, a phenomenon that is also true for reverse-link operation of the Network unit 502 and the User unit 504. To keep the two feed-back loops in a stable operating region, in the forward-link the Down-link System Link Gain, $G_{dl}$, is less than the Down-link System Path Loss, $PL_{dl}$, by $dg_{dl}$, so as to avoid a "positive feed-back" loop in the system, for example $G_{dl}=PL_{dl}-dg_{dl}$(dB). Equally, in the reverse-link, the Up-link System Link Gain, $G_{ul}$, is less than the Up-link System Path Loss, $PL_{ul}$, by $dg_{ul}$, so as to avoid a "positive feed-back" loop in the system. for example $G_{ul}=PL_{ul}-dg_{ul}$ (dB). The propagation losses, $PL_{ul}$ and $PL_{dl}$, may be due to shadowing, distance and antenna radiation pattern, and multipath propagation as well as wall penetration loss. The levels of these propagation losses, $PL_{ul}$, and $PL_{dl}$, are not readily available and are measured.

3. Continuous and correct operation of the Network unit 502 and User unit 504 is monitored. Any operational problem at the Network unit 502 or the User unit 504 can result in unwanted transmissions in either forward or reverse (or both) links. Further, the system may rely on radio channels operating at unlicensed frequency bands, which are prone to interference from other unlicensed devices. Also, operation of the Network unit 502 and the User unit 504 is coordinated. Therefore a control-signaling channel is inserted between the two Network 502 and the User 504 units.

4. The local oscillators of the network unit 502 and the User unit 504 are substantially similar in frequency, as any large frequency error between the Network 502 and the User 504 units will result in an unacceptable cellular link performance. In some embodiments, a pilot signal can be transmitted in a control link from the network unit 502 to the user unit 504 and used for synchronization of local oscillators of the two units. In other examples, an electric power supply waveform can be used for synchronization of local oscillators in the two units.

5. In conventional repeaters sufficient isolation between antennas corresponding to antennas 512 and 506 in the illustrative embodiment is normally supplied by use of directional antennas. Such directional antennas inherently have large apertures, leading to large size antennas. To enable maximum RF isolation between the antennas, advanced adaptive temporal and spatial signal processing techniques are used, enabling antenna directivity requirements to be relaxed.

Advanced Features

Illustrative advanced features include design solutions that are useful in countering the enumerated problems.

Figure 7:
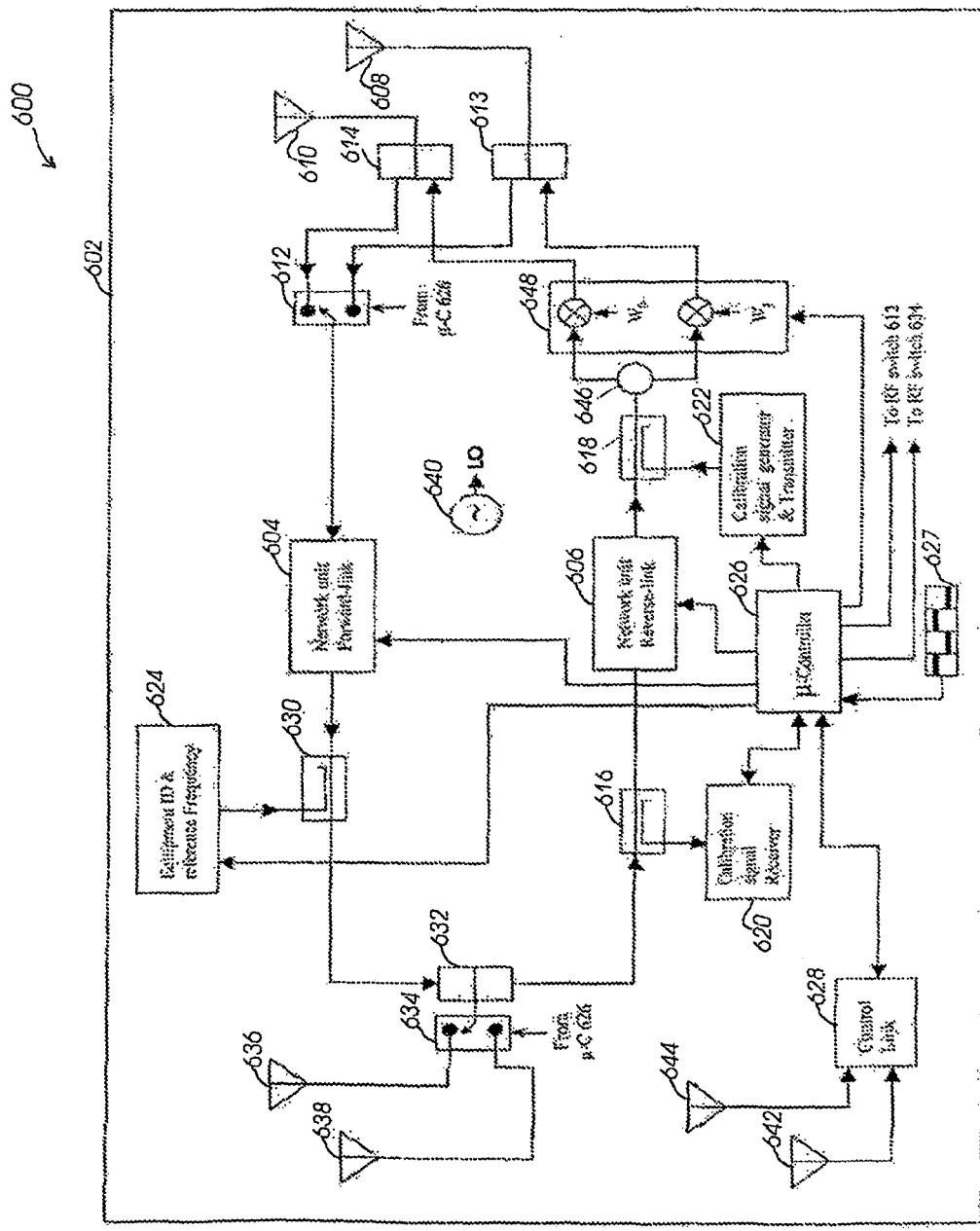
FIG. 7 is a schematic block diagram that illustrates an embodiment of a system including a Network unit implementing antenna diversity.

FIG. 7 shows a system 600 including the Network unit 602 (502 in FIG. 6) with the new design features included. Two antennas 610 and 608 are used for antenna diversity, instead of a single antenna 506 in FIG. 6. Also two antennas 636 and 638 are used for antenna diversity, instead of a single antenna 512 in FIG. 6. Although any diversity-combining scheme such as Maximal Ratio Combining or others can be used for the receiver chain, and transmit diversity schemes such as random phase change in one or both antennas may be used for the transmitter chain, a simple scheme that is based on antenna switched diversity is suggested herein for the receiver part. Switching may be continuous or based on received signal power level. Therefore, the RF switch 612 connected to duplexers 614 and 613 and the Forward-link Network unit 604 performs switching operations for the cellular receive operation of the Network unit 602. Also, the RF switch 634 connected to antennas 636 and 638 and the duplex filter 632 performs switching operations for the U-NIT band transmit/receive operation of the Network unit 602. The duplex filters 614 and 613 are also connected to antennas 610 and 608 on one side, and the Complex-Weight unit 648 on the other side, as well as the RF switch Unit 612. The complex-weight unit 648 is connected to power-splitter (hybrid combiner) 646 and the micro-controller 626. The power-splitter (hybrid combiner) 646 is connected to Reverse-link Network unit 606 via the directional coupler 618. In one embodiment, all directional couplers may be 17 dB directional couplers. Also, the duplex filter 632 is connected to Forward-link Network unit 604 via the directional coupler 630, and Reverse-link Network unit 606 is connected via the directional coupler 616. Hybrid combiners may otherwise be used in place of the directional couplers 618, 630 and 616. The Reverse-link Network unit 606 receiver unit 310 internal LNA may be positioned before the directional coupler 616, or the hybrid combiner replacement, in diagram 600 in a configuration that may be advantageous in some embodiments.

Figure 8:
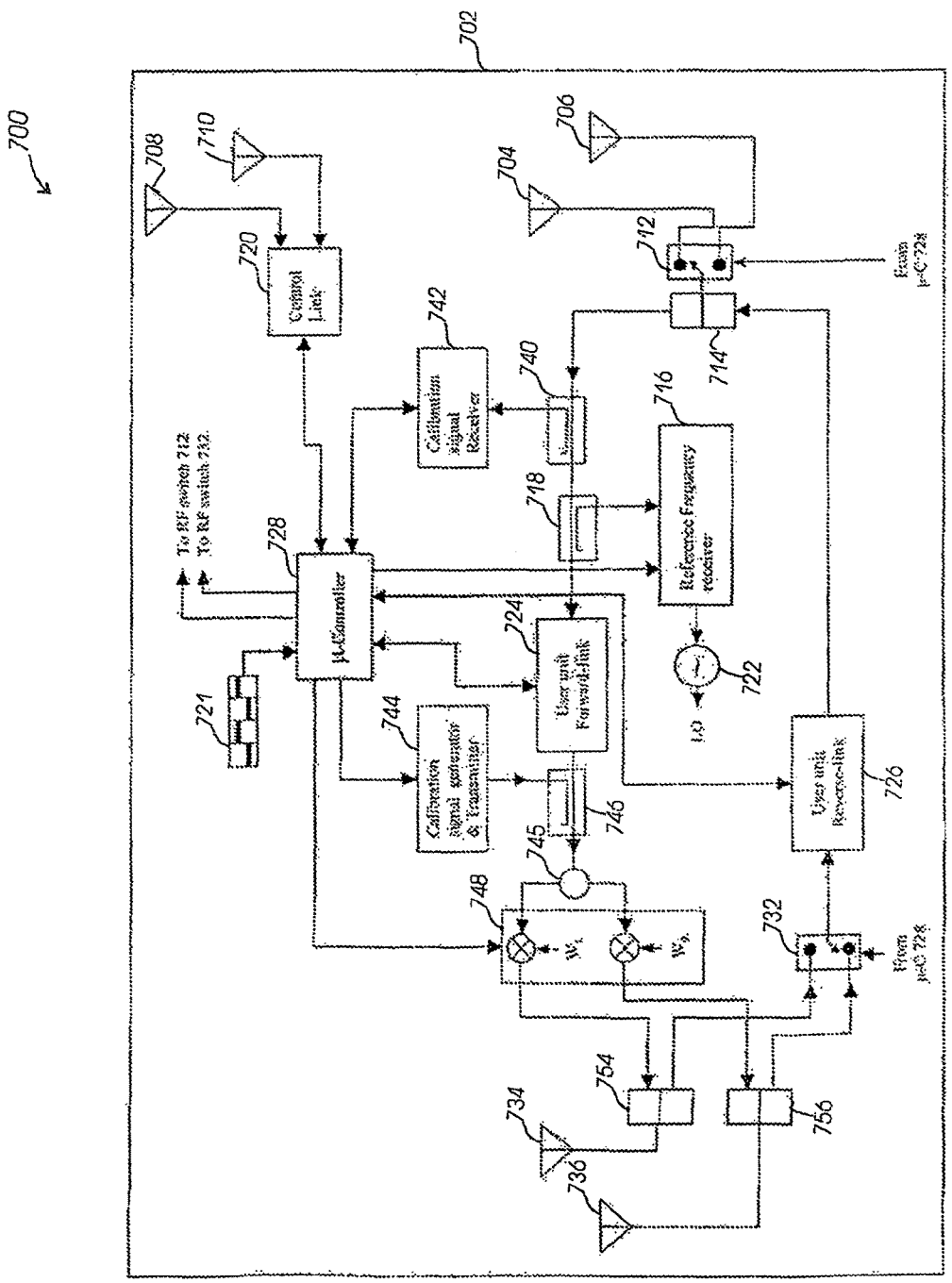
FIG. 8 is a schematic block diagram depicting an embodiment of a repeater that uses two antennas for antenna diversity.

A calibration signal generator/transmitter unit 622 is coupled to the reverse-link transmitter path of the Network unit 602 via the directional coupler 618. The unit 622 supplies a channel-sounding signal, which is used to establish the complex channel characteristics between the Network unit 602 antennas 608 and 610, and the input to the calibration signal receiver 620. The channel-sounding signal generated by unit 622 is transmitted via the complex-weight unit 648 and the diversity antennas 610 and 608 with a maximum transmit level, which is substantially below any expected signal level from cellular network (for example 20 dB below the minimum expected cellular signal level). The combined transmitted channel-sounding signal level and the processing gain used in the calibration signal receiver unit 620 are equal to or less than the Up-link Gain Margin ($dg_{ul}$). The channel-sounding signal generated by unit 622 is a direct-sequence spread spectrum signal modulated by a known Pseudo Random (PN) code with a known code phase (referred to hereafter as "own code" phase) and with a chipping rate comparable to the forward and reverse links of the Network unit 602 and User unit 702 (in FIG. 8) operating bandwidths (e.g. 5 Mchips/s for 5 MHz bandwidth) and a minimum code length to supply sufficient processing gain, which also has a code time duration longer than the maximum expected path delay. A code length of 1000 chips is adequate for most scenarios. The channel-sounding signal can be transmitted continuously or transmitted only when required. The code phases are selected such that the minimum code phase difference is larger than the maximum expected path delay, measured in multiple number of chips, and after that the code phases should be multiple integer of the minimum code phase. The calibration signal receiver unit 620 is coupled to the reverse-link receive path of the Network unit 602 by directional coupler 616. The calibration signal receiver unit 620, using the known PN code and the transmit code phase, detects and demodulates the channel-sounding signal transmitted by unit 622, which enters the reverse-link path via the closed-loop mechanism that exists between the Network unit 602 and the User unit 702 in FIG. 8, shown as user unit 504 in FIG. 6. The calibration signal receiver unit 620 is configured to establish the received signal strength and phase—the complex channel impulse response that exists between the Network unit 602 combined outputs of antennas 608 and 610 and the input to the calibration signal receiver 620. The calibration signal receiver unit 620 establishes received signal strength and phase either by correlation operation, similar to a RAKE receiver path searcher, or by matrix inversion operation on an appropriate block of sampled received signal, discussed in more detail in appendix A. The calibration signal receiver unit 620 includes many sub-units, including a frequency converter, to return the calibration signal to base-band frequencies and other units such as A/D converters and base-band processors to perform base-band algorithms which are not shown in the diagram. The PN code phase can be assigned uniquely, or drawn according to a random algorithm, such that the probability of two units having the same code phase can be very low. Other code offset assignment strategies are also possible, such as dynamic assignment, where the code offset is selected if no such offset was detected in that geographical area. The feature enables the calibration signal receiver 620 to be able to scan and receive "other code" phases, and hence establishing whether any other signal couples to or from other units that may be operating in the same geographical area. More than one code phase can be used to establish the complex channel impulse response so that the probability of detection by other systems is increased. The PN code used for the channel-sounding signal can be modulated with information about the identity of the Network unit 602. The carrier frequency of the transmitted channel-sounding signal can be at the operating cellular frequency band. However, carrier frequencies in other bands, such as ISM band at 2.4 GHz, may be used for transmission of the channel-sounding signal. When carrier frequencies in the other bands are used, the calibration signal generator and transmitter 622 carrier frequency is placed as near as possible to the operating frequency band. The chipping rate and the transmit power of the channel-sounding signal PN code are implemented in a manner that the channel-sounding signal complies with the FCC 47 CFR Part-15 rules. The ISM band is not the same as the cellular operating band, but is sufficiently close to enable the system to converge the spatial algorithm weights and establish weights $W_0$ and $W_1$ used in the complex-weight unit 648. Any antenna and propagation differences in average signal power and antenna behavior between the ISM and cellular operating bands can be taken into account in an operating implementation.

The Equipment ID and reference frequency unit 624 basically generates a Binary Phase Shift Keying (BPSK) signal, modulated by the equipment ID number and placed at a suitable part of U-NII band, and is coupled in the transmitter path of the forward-link of the Network unit 602 via the directional coupler 630. The unit is "frequency locked" to the local oscillator of the Network unit 602. The carrier frequency of the signal is selected to avoid an unacceptable interference to the main cellular signal in the transmit path of the forward-link of the Network unit 602, but is sufficiently close for an optimum transmission bandwidth. Where the Network unit 602 and the User unit 702 use the mains electricity supply for their operations, the 60 Hz or 50 Hz mains oscillations can be used to "lock" the local oscillators of the two units to a common frequency source. The 60 Hz or 50 Hz mains oscillations are converted, by suitable circuitry, to the selected frequency for the operation of the Network unit 602 and the User unit 702.

The Control Link unit 628 is a radio link between the two, Network unit 602 and the User unit 702 in FIG. 8. It may be a simple proprietary link that operates in one of the unlicensed band of frequencies, or may be an in-band control signaling, multiplex with the cellular signal path. It may also be a standard wireless link such as 802.11b, 802.11a or Bluetooth, designed to operate in unlicensed frequency band. The control link unit 628 is connected to micro-controller unit 626, and is able to communicate through an appropriate interface. The control link unit 628 is also connected to antenna 644 and 642 for transmission and reception of the control signals. If operating bandwidth and frequencies allow, with minor modifications to init 602, antenna units 636 and 638 can also be used for the operation of control link unit 628. In some embodiments, the User unit 702 can be a very simple device with all signal processing and control functionalities supported in the Network unit 602. If so, the control link unit 628 can be eliminated or may implement very simple control signaling such as in-band frequency tones to set the system bandwidth and gain in the User unit 702. Provided that the antenna bandwidth allows, with minor modifications to unit 602, antenna units 636 and 638 can also be used for control link unit 628 operations.

Micro-controller unit 626 may be a simple micro-processor such as ARM7 or ARM9 with appropriate memory and interfaces. The micro-controller unit 626 is controlling the operation of the Network unit 602, and may perform some additional signal conditioning and processing such as signal level averaging, estimation, and adaptive algorithms such as Least Mean-Square (LMS) and Recursive Least Squares (RLS), where useful. Operations of micro-controller unit 626 include setting the operating bandwidth and set the weights $W_0$ and $W_1$ to communicate and control the User unit 702 in FIG. 8 via the control link unit 628, communicate and control the calibration signal generator and transmitter 622 and calibration signal receiver 620, operate switching for the receiver antenna diversity, and monitor the correct operation of the Network unit 602 and User unit 702. Micro-controller unit 626 is connected to units 627, 628, 622, 606, 604, 620, 648 and 624, as well as the RF switches 634 and 612. The micro-controller 626, using the complex channel impulse response at the output of the calibration signal receiver unit 620 and using Least Mean-Square (LMS), Recursive Least Squares (RLS), QR-RLS, or QR decomposition, computes values of the complex weights, $W_0$ and $W_1$ such that the received complex channel impulse response at the output of the calibration signal receiver unit 620 is reduced or minimized in magnitude. With such transmit weights arrangement, the RF isolation for up-link frequencies between the Network unit 602 and the User unit 702 is adapted within the propagation channel, enabling the maximum possible overall ERP (Effective Radiated Power) from antennas 608 and 610, and hence the maximum coverage footprint.

Units 628, 622, 606, 604, 620, 624 are all connected to local oscillator unit 640, and derive clock and reference frequencies from the local oscillator 640 signal. A simple user interface unit 627, for example a keypad, simple dipswitch or similar device, is connected to micro-controller unit 626. The Network unit 602 has a unique "identity code", which can be set by the user interface unit 627, is accessible by the micro-controller unit 626, and can be communicated to the User unit 702 micro-controller unit 728 or any other User units that may be within the operating range of Network unit 602.

FIG. 8 shows an embodiment of a repeater 700 including the User unit 702 (504 in FIG. 6) with the new design features included. Two antennas 734 and 736 are used for antenna diversity, instead of a single antenna 512 in FIG. 6. Also, two antennas 704 and 706 are used for antenna diversity, instead of a single antenna 510 in FIG. 6. Although any diversity-combining scheme such as Maximal Ratio Combining, etc. can be used for the receiver chain, and transmit diversity schemes such as random phase change in one or both antennas for the transmitter chain, a simple scheme that is based on antenna switched diversity can be implemented for the receiver. The switching can be continuous or based on received signal power level. Therefore, the RF switch 732 connected to duplexers 754 and 756 and the Reverse-link User unit 726 performs switching operations for the cellular receive operation of the User unit 702. Also, the RF switch 712 connected to antennas 704 and 706 and the duplex filter 714 performs switching operations for the U-NII band transmit/receive operation of the User unit 702. The duplex filters 754 and 756 are also connected to antennas 734 and 736 on one side, the Complex-Weight unit 748 on the other side, as well as the RF switch unit 732. The complex-weight unit 748 is connected to power-splitter (hybrid combiner) 745 and the micro-controller 728. The power-splitter (hybrid combiner) 745 is connected to Forward-link User unit 724 via the directional coupler 746. All directional couplers in may be 17 dB directional couplers. Also, the duplex filter 714 may be connected to Forward-link User unit 724 via the directional couplers 740 and 718, and also connected to Reverse-link User unit 726. The Forward-link User unit 328 receiver 210 internal LNA may be positioned prior to the directional couplers 718 and 740 in diagram 700, a configuration that may enhance performance.

A calibration signal generator/transmitter unit 744 is coupled to the forward-link transmitter path of the User unit 702 via the directional coupler 746. The unit 744 generates a channel-sounding signal, which is used to establish complex channel characteristics between the User unit 702 antennas 734 and 736, and the input terminal to the calibration signal receiver 742. The channel-sounding signal generated by unit 744 is transmitted via the complex-weight unit 748 and the diversity antennas 734 and 736 with a maximum transmit level that is substantially below any expected signal level from cellular network, for example 20 dB below the minimum expected cellular signal level. The combined transmitted channel-sounding signal level and the processing gain used in the calibration signal receiver unit 742 is less than or equal to Down-link Gain Margin, $dg_{dl}$. The channel-sounding signal generated by unit 744 is a direct-sequence spread spectrum signal modulated by a known Pseudo Random (PN) code with a known code phase, for example termed an "own code" phase, and having a chipping rate comparable to the forward and reverse links of the User unit 702 and Network unit 602 shown in FIG. 7 operating bandwidths of, for example 5 Mchips/s for 5 MHz bandwidth. The PN code further may have the minimum code length sufficient to supply suitable processing gain and which exceeds the maximum expected path delay. A PN code length of 1000 chips is adequate for most scenarios. The channel-sounding signal can be transmitted continuously or transmitted only when evoked by conditions. Code phases are selected so that the minimum code phase difference is larger than the maximum expected path delay measured in multiple chips. Subsequent code phases can be a multiple integer of the minimum code phase. The calibration signal receiver unit 742 is coupled to the forward-link receive path of the User unit 702 by directional coupler 740 and uses the known PN code and the transmit code phase to detect and demodulate the channel-sounding signal transmitted by unit 744. The channel-sounding signal enters the reverse-link path via the closed-loop mechanism between the User unit 702 and the Network unit 602 in FIG. 7, also shown as unit 502 in FIG. 6. The calibration signal receiver unit 742 adapted to establish the received signal strength and phase. A complex channel impulse response exists between the User unit 702 combined outputs of antennas 734 and 736, and the input terminal to the calibration signal receiver 742. The calibration signal receiver unit 742 sets received signal magnitude and phase either by correlation operation, for example similar to a RAKE receiver path searcher, or by matrix inversion operation on an appropriate block of sampled received signal, as disclosed in appendix A. The calibration signal receiver unit 742 includes many sub-units, such as a frequency converter that returns the calibration signal to base-band frequencies and other units such as A/D converters and base-band processors to perform base-band algorithms. The sub-units are not shown in the diagram. The PN code phase can be assigned uniquely or drawn according to a random algorithm so that the probability of two units having the same code phase is very low. Other code offset assignment strategies are also possible. For example, dynamic assignment may be used so that the code offset is selected to avoid other such offsets in the same geographical area. Dynamic assignment enables the calibration signal receiver 742 to scan and receive "other code" phases and hence establish whether any other signal couples to or from other units that may be operating in the same geographical area. Further, more than one code phase can be used to establish the complex channel impulse response so that the probability of detection by other systems is increased. The PN code used for the channel-sounding signal can be modulated with information about the identity of the User unit 702. The carrier frequency of the transmitted channel-sounding signal may be at the operating cellular frequency band. However, carrier frequencies in other bands such as ISM band at 2.4 GHz may be used for transmission of the channel-sounding signal. Usage of the other bands enables the calibration signal generator and transmitter 744 carrier frequency to be placed as near as possible to the operating frequency band. The chipping rate and the transmit power of the channel-sounding signal PN code are selected so that the channel-sounding signal complies with the FCC 47 CFR Part-15 rules. The ISM band, although different from the cellular operating band, is sufficiently close to enable the system to converge the spatial algorithm weights, and establish the weights $W_0$ and $W_1$ used in the complex-weight unit 748. Any antenna and propagation differences in average signal power and antenna behavior between the ISM and cellular operating bands can be investigated in the design phase and taken into account in the final system design.

The Reference signal receiver unit 716, which is capable of receiving the transmitted signal generated by the equipment ID and reference frequency unit 624 in FIG. 7, is connected to the directional coupler 718. The receiver is capable of extracting the reference frequency and the ID code transmitted by the Network unit 602 equipment ID and reference frequency generator 624. The extracted reference frequency is then used to provide a reference local oscillator 722. The directional coupler 718 is connected to the Forward-link User unit 724. Reverse-link User unit 726 is connected to duplex filter 714. The reference signal and the local oscillator unit 722 can alternatively be based on the control link unit 720 oscillator, if the unit 726 is capable of locking to the received signal carrier frequency which has been transmitted by control link unit 628 of the Network unit 602.

The Control Link unit 720 is a radio link between the two, Network unit 602 and the User unit 702. It may be a proprietary link that operates in one of the unlicensed band of frequencies, or may be a standard wireless link such as 802.11b, 802.11a or Bluetooth, designed to operate in unlicensed band. The control link unit 720 is connected to micro-controller unit 728, and is able to communicate through an appropriate interface. The control link unit 720 is also connected to antennas 708 and 710 for transmission and reception of the control signals. Note that provided that the antenna bandwidth and operating frequency allow, with minor modifications to unit 702, antenna units 704 and 706 can also be used for the control link unit 720 operations.

Micro-controller unit 728 is a simple microprocessor such as ARM7 or ARM9 with appropriate memory and interfaces. The micro-controller unit 728 is controlling the operation of the User unit 702 and may perform some additional signal conditioning and processing such as signal level averaging and estimation and adaptive algorithms such as LMS and RLS in suitable conditions. The micro-controller unit 728 may set operating bandwidth and set weights $W_0$ and $W_1$ to communicate and control the Network unit 602 in FIG. 7 via the control link unit 720, and to communicate and control the calibration signal generator and transmitter 744 and calibration signal receiver 742. The micro-controller unit 728 may also operate switching for receiver antenna diversity and monitor the correct operation of the User unit 702. Micro-controller unit 728 is connected to units 720, 742, 744, 716, 748, 726, and 724, as well as the RF switches 732 and 712. The micro-controller 728 may use a complex channel impulse response at the output of the calibration signal receiver unit 742 and use Least Mean-Square (LMS), Recursive Least Squares (RLS), QR-RLS, or QR decomposition to compute optimum values of complex weights, $W_0$ and $W_1$ such that the received complex channel impulse response at the output of the calibration signal receiver unit 742 is reduced or minimized. With the disclosed transmit weights arrangement, the RF isolation for down-link frequencies between the User unit 702 and the Network unit 602 is adapted within the propagation channel, enabling a maximum possible overall ERP (Effective Radiated Power) from antennas 734 and 736 and a maximum coverage footprint.

Units 720, 726, 724, 742, 744 and 728 are depicted connected to local oscillator unit 722 and derive clock and reference frequencies from the local oscillator 722 signal. A simple user interface unit 721, for example a keypad or simple dipswitch, may be connected to micro-controller unit 728. The Network unit 702 has a unique "identity code" which can be set by the user interface unit 721, is accessible to micro-controller unit 728, and can be communicated to the Network unit 602 micro-controller unit 626 or other Network or User units that may be within the operating range of User unit 702.

Techniques, such as the use of vertical polarization for antennas units 610 and 608, and horizontal polarization for antennas 734 and 736 can further improve the system performance. It is also possible to improve system performance by the use of directional antennas, as in conventional booster and repeater systems.

The unique Network unit 602 identity code and optionally device location can be transmitted to the cellular network. The information can be used to locate a user in an indoor environment, for example by generating a heavily coded (protected), low bit rate data, containing a long known preamble, the unique identity code and optionally the longitude and the latitude of the Network unit 602. The information can then be pulse-shaped for low spectral leakage and superimposed on the reverse-link signal of a given channel by an appropriate modulation scheme, within the Network unit 602. The choice of the modulation scheme depends on the operating cellular system. For example, for GSM, which enjoys a constant envelope modulation such as Gaussian Minimum Shift Keying (GMSK), amplitude modulation (with low modulation index) can be used. For Code Division Multiple Access (CDMA) systems, with fast reverse-link power control, Differential Binary Phase Shift Keying (DBPSK) can be used as the modulation scheme. The extraction of the above mentioned information from the received channel signal at base station may involve base station receiver modifications, but does not effect the normal operation of the cellular link.

What is claimed is:

1. A repeater system that mediates traffic between a network transceiver and a user transceiver in a wireless communication system, the repeater system comprising:
    a network unit that maintains a network link with the network transceiver;
    a user unit that is physically separated by a distance from the network unit and that maintains a user link with the user transceiver;
    a two-way wireless communication pathway in the distance between the network unit and the user unit adapted to communicate signals between the network transceiver and the user transceiver in autonomous repeater hops between the network transceiver and the network unit, between the user transceiver and the user unit, and in the two-way communication pathway between the network unit and the user unit including downlink transmission from the network unit to the user unit and uplink transmission from the user unit to the network unit; and
    wherein both the network unit and the user unit have a detection unit, the detection unit of the network unit being adapted to detect frame timing of downlink transmissions by detecting a preamble sequence of downlink transmissions, and the detection unit of the user unit being adapted to detect frame timing of uplink transmissions by detecting a preamble sequence of uplink transmissions; and
    wherein the detection unit of the network unit is adapted to detect start of frame timing of a downlink asymmetric Time Division Duplex (TDD) transmission and pass the frame timing to the user unit while the frame is being delayed; and the network unit being adapted to detect a change in transmission pattern and send information to the user unit whereby both the network unit and the user unit switch to receive mode for detecting a preamble of an incoming frame.

2. The repeater according to claim 1 further comprising:
    the detection unit configured to enable the network unit and the user unit to detect start of downlink by the network unit and/or detect start of uplink by the user unit in a beacon channel.

3. The repeater according to claim 1 further comprising:
    the detection unit configured to enable the network unit and the user unit to detect start of downlink by the network unit and/or detect start of uplink by the user unit in a pilot channel.

4. The repeater according to claim 1 further comprising:
    the detection unit configured to enable the network unit and the user unit to detect start of downlink by the network unit and/or detect start of uplink by the user unit in a broadcast channel.

5. The repeater according to claim 1 further comprising:
the detection unit configured to enable the network unit and the user unit to detect start of downlink by the network unit and/or detect start of uplink by the user unit in a traffic channel.

6. The repeater according to claim 1 further comprising:
the detection unit configured to detect in time and/or frequency the preamble.

7. The repeater according to claim 1 further comprising:
the detection unit adapted to detect frame timing of downlink and uplink Time Division Duplex (TDD) transmissions respectively by detecting a preamble sequence of the downlink and/or uplink transmissions.

8. The repeater according to claim 1 further comprising:
the detection unit adapted to detect a start of frame timing of a downlink symmetric Time Division Duplex (TDD) transmission and pass the start of frame timing to the user unit; and the user unit adapted to control timing of the uplink TDD transmission according to the start of frame timing.

9. The repeater according to claim 1 further comprising:
the detection unit adapted to detect frame timing of a downlink symmetric Time Division
Duplex (TDD) transmission and pass the frame timing to the user unit; and the two-way communication pathway configured to transmit a calibration signal in one of the forward link or reverse link at one time that results in a sounding signal, and respond by passing the calibration signal in an opposite link in a next frame transmission.

10. The repeater according to claim 1 further comprising:
the detection unit adapted to detect end of frame timing detected as a received signal level change.

* * * * *